UNITED STATES PATENT OFFICE.

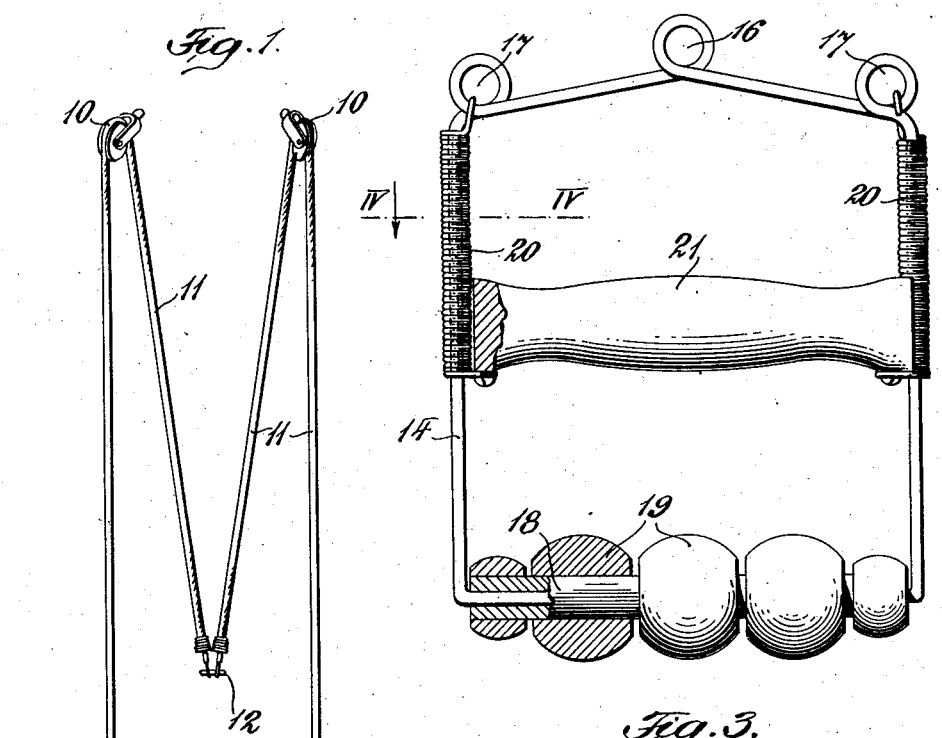
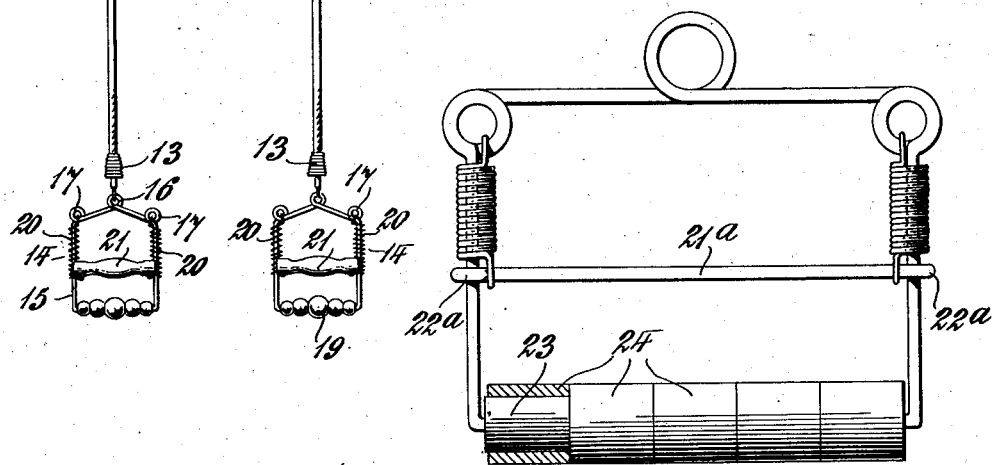
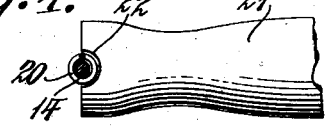

ARTHUR AUBRIOT PONS, OF NEW YORK, N. Y., ASSIGNOR TO PONS ATHLETIC SUPPLY COMPANY, A CORPORATION OF NEW YORK.

EXERCISING APPARATUS.

1,010,796. Specification of Letters Patent. Patented Dec. 5, 1911.

Application filed November 19, 1909. Serial No. 528,915.

*To all whom it may concern:*

Be it known that I, ARTHUR A. PONS, a citizen of the United States, and resident of the borough of Bronx, city, county, and State of New York, have invented certain new and useful Improvements in Exercising Apparatus, of which the following is a specification, reference being had therein to the accompanying drawings, in which—

Figure 1 is an elevation of the apparatus complete; Fig. 2 a side elevation of the handle device, a portion of the grip being shown in section to more clearly illustrate its construction; Fig. 3 a similar view of a slightly different form of handle, a portion of the grip thereof being shown in sectional view; and Fig. 4 a detail sectional view of one side bar of the handle frame taken on the line IV—IV of Fig. 2.

This invention relates to an apparatus which may be used for exercising and strengthening various parts of the body.

The primary object of the invention is to provide a simple and efficient apparatus adapted to be used in place of the ordinary weight-pull, and which is adapted for exercising the hands, a part of the apparatus being constructed for use as a massaging device.

A further object of the invention is to provide a simple and efficient handle which may be used in various ways and in various connections.

With these and other objects in view the invention will be hereinafter more particularly described with reference to the accompanying drawing which forms a part of this specification and will then be particularly pointed out in the claims.

Referring to the various parts by numerals, 10 designates a pair of pulleys which may be secured to a support in any suitable manner. Over these pulleys are arranged pull-cords 11 which may be of elastic or non-elastic material as desired. As shown in Fig. 1, one end of each of said pulley cords is connected to a ring 12 which is rigidly secured to a suitable support. In this form of the device the pull-cords 11 are preferably elastic. It will, of course, be understood that the inner ends of these cords may be attached to weights, in which event the said cords need not be elastic.

To the outer ends of the pull-cords are connected clips 13 to each of which is connected a handle 14. Each of said handles consists of an open wire frame 15 having an attaching eye 16 in the middle of its upper cross-bar by means of which the handle is connected to the pull-cord. At the connection of the said upper cross-bar with the side bars of the handle frame eyes 17 are formed. The lower cross-bar of the frame is formed with a cylindrical rod or roller 18, as shown clearly in Fig. 2, and on this rod are massaging rollers or elements 19, said rollers being convex and of varying sizes, the larger rollers being in the center of the handle and the smaller ones near the side bars thereof. The bar 18 and the rollers 19 constitute the main grip-bar. The object of thus forming the lower cross-bar or grip of the handle is that it may be used as a massaging device, as will be more clearly hereinafter set forth.

Surrounding the upper portions of the side bars of the handle frame are coil springs 20, whose upper ends are secured to the eyes 17. The lower ends of these springs are connected to the under side of a supplemental grip 21, as clearly shown in Fig. 2. The ends of the supplemental grip 21 are vertically grooved, as at 22, to embrace the springs 20, as clearly shown in Figs. 2 and 4 of the drawing, whereby said supplemental grip will be guided in its reciprocating movement within the handle frame. By thus grooving the grip 21 and causing it to engage the springs 20, said grip will be prevented from twisting or turning over in the handle frame, when a strain is brought thereon, as will be more fully hereinafter set forth.

The rollers 19 may be formed of wood or rubber, or any other suitable material and are independently rotatable on the bar 18 and form a series of rubbing devices, thereby converting the handle into a massaging implement. It will be readily seen that the handle may be thus used and that it may be disconnected from its pull-cord for this purpose if it be so desired. It is also clear that by arranging the springs 20 around the side bars of the handle frame said springs will be protected by said frame.

In Fig. 3 the supplemental grip 21ª consists of a wire cross-bar formed with eyes 22ª through which the bars of the handle frame extend, said eyes serving as guides to maintain the supplemental grip in proper relation with the lower cross-bar of the handle.

In this construction the lower cross-bar of the handle consists of a transverse cylindrical bar 23 on which are mounted a series of independently rotatable sleeves or rollers 24, said rollers being cylindrical and formed of wood or rubber or any other suitable material.

From the foregoing it is manifest that the apparatus may be used in various ways for strengthening various parts of the body. As arranged in Fig. 1, it may be used as a pull device and by grasping the gripping bars of the handle and drawing the supplemental grip downward to the rigid member thereof the muscles of the hands may be exercised and developed and strengthened. The rollers 19 will serve as a massaging device for the hands during the performances of the ordinary exercises of the apparatus, and whenever desired the handle may be used independently as a massage device, the rollers 19 being rubbed on that part of the body which it is desired to massage. When the handle is used in this manner it may be detached from the pull-cord or not, as desired.

Having thus described my invention, what I claim as new and desire to secure by Letters Patent is:

1. A handle for an exercising apparatus comprising an open frame formed with an eye at the center of one end bar and additional eyes in said end bar on each side of the center eye, a cylindrical rod forming the other end bar of the handle frame, a plurality of independently rotatable rollers on said bar and forming a main grip, a supplemental grip bar mounted within the handle frame, a coil spring surrounding a portion of each side bar of the handle frame, one end of each of said springs being connected to the supplemental grip bar and to one of the eyes in the said bar of the handle frame, the ends of the supplemental grip being grooved to receive the spring on the handle frame.

2. A handle for exercising apparatus comprising an open frame formed of two side bars and two end bars, a supplemental grip bar mounted within the handle frame and having a sliding engagement with the side bars to move to and from one of the end bars, a spring coiled on each side bar connected with the ends of the said grip bar respectively, one of the end bars being provided with an attaching eye at its middle portion, the other end bar of the frame forming a bearing throughout its length, and a series of rollers extending throughout the bearing and independently rotatable thereon.

3. A handle comprising a frame formed of a single length of material shaped to provide end and side bars, one of the end bars being provided with central and end eyes, massaging means carried by the other end bar, a grip bar having its ends slidably engaged with the side bars, and springs coiled about the side bars and having one of their ends fastened to the end eyes and their other ends fastened to the ends of the grip bar.

This specification signed and witnessed this 1st day of November A. D. 1909.

ARTHUR AUBRIOT PONS.

Witnesses:
E. WHITFIELD,
P. E. LARSON.

---

Copies of this patent may be obtained for five cents each, by addressing the "Commissioner of Patents, Washington, D. C."